Patented May 6, 1947

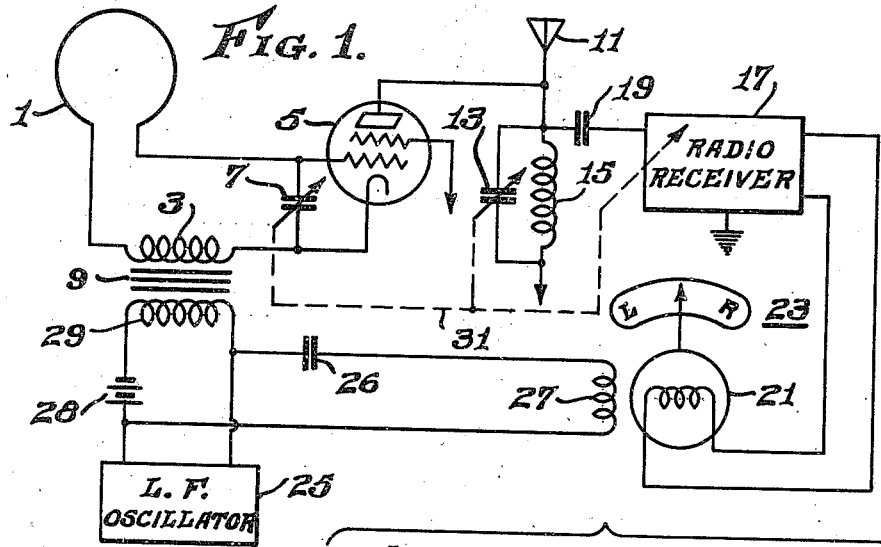
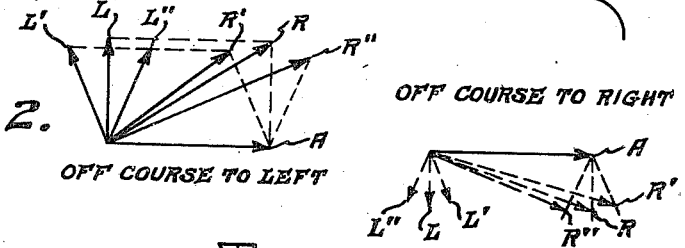
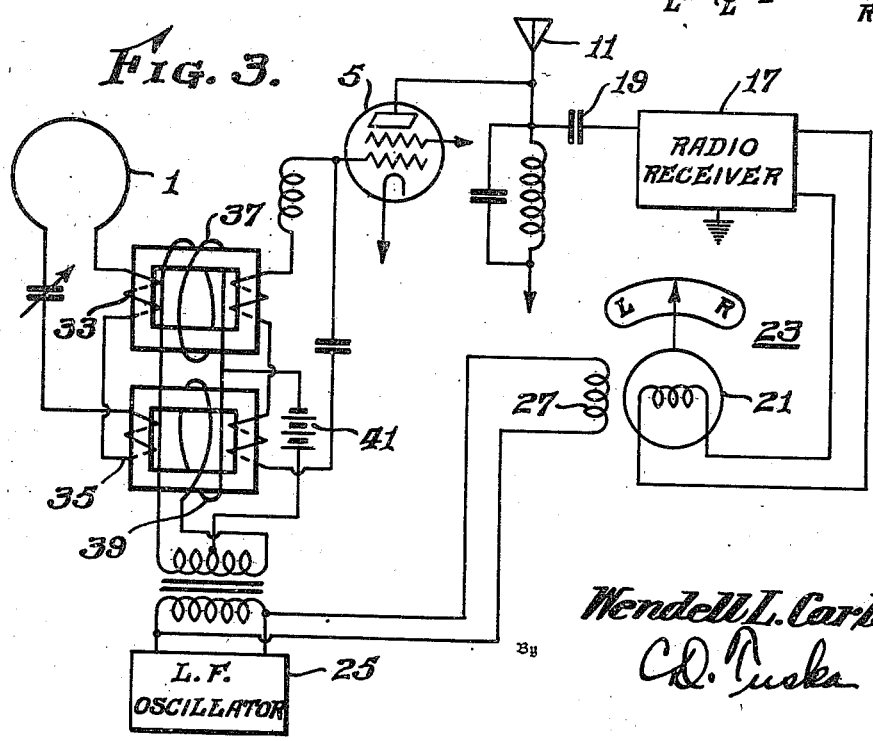
Inventor
Wendell L. Carlson
Attorney

2,419,987

UNITED STATES PATENT OFFICE 2,419,987

DIRECTION FINDER

Wendell L. Carlson, Haddonfield, N. J., assignor to Radio Corporation of America, a corporation of Delaware Application July 30, 1942, Serial No. 452,815

5 Claims. (Cl. 250—11)

1

This invention relates to radio direction finders, and more particularly to direct indicating systems of the type in which the output of a directional antenna is combined with that of a non-directional antenna to provide a left-right indication of the deviation of the directional antenna from the azimuth of arrival of a signal.

Systems of this type usually comprise a directive antenna, a non-directive antenna, and a common receiver for both antennas, with some sort of switching means arranged to reverse periodically the polarity of one of the antennas. The figure-of-eight directive patterns of the directive antenna, which may be a loop, are thus combined with the circular pattern of the non-directional antenna so as to produce alternately overlapping cardioid patterns. A center-zero indicator is connected in the receiver output and reversed synchronously with the antenna switching. When the axis of the loop is directed toward the transmitting station, the signals received on the two cardioids are equal, and the indicator is not deflected. When the signal arrives in some direction at an angle other than along the loop axis, the signal picked up from the field corresponding to one cardioid pattern is greater than that picked up from the field corresponding to the other cardioid pattern, and the indicator is accordingly deflected to the left or right, as the case may be.

The periodic antenna reversal may be accomplished by balanced modulators, using vacuum tubes, or by vibratory or rotary switches. Each of these methods has its advantages, as well as the disadvantages of a somewhat complicated organization. In a mobile installation, on aircraft, for example, simplicity and lightness are matters of primary importance.

Accordingly, it is an object of this invention to provide an improved method of and means for combining the outputs of the antennas in an automatic left-right direction indicator.

Another object is to provide an improved method of and means for modulating the loop signal without resorting to vacuum tube modulators or moving parts.

A further object is to provide improved and simplified direction finder circuits employing saturable core inductors.

These and other and incidental objects will become apparent to those skilled in the art upon consideration of the following description, with reference to the accompanying drawing, of which Fig. 1 is a schematic circuit diagram of a preferred embodiment of the invention, Fig. 2 is a vector diagram illustrating the operation of the circuit of Fig. 1, and Fig. 3 is a circuit diagram of a modification of Fig. 1.

Referring to Fig. 1, a loop antenna 1 is connected in series with an inductor 3 to the grid-cathode circuit of an amplifier tube 5. The loop and inductor are tuned by a variable condenser 7. The inductor 3 is provided with a ferromagnetic core 9, such as a body of comminuted magnetite with a binder of insulating material.

A non-directive antenna 11 is connected to the plate circuit of the tube 5, which includes the resonant circuit 13, 15. This circuit is coupled to the input of a radio receiver 17 through a capacitor 19. The output of the receiver 17 is connected to the movable coil 21 of a left-right indicator 23. A low frequency oscillator 25 is connected to the stator coil 27 of the indicator 23 through a blocking condenser 26 and to a winding surrounding the core 9 through a D.-C. source such as a battery 28.

The operation of the system is as follows: The tuning condensers 7 and 13, and the radio receiver 17 are adjusted so that the antenna and receiver circuits resonate at the desired frequency. The controls may be ganged for simultaneous operation, as indicated by the dashed line 31. The oscillator 25, operating at a frequency of, for example, 1000 cycles per second, energizes the winding 29 and periodically varies the inductance of the winding 3 by magnetic saturation of the core 9. The resonant frequency of the circuit comprising the loop 1, the condenser 7, and the inductance 3 is accordingly varied at the oscillator frequency. The resultant signal output of this circuit passes through the amplifier 5 and is combined in the circuit 13, 15 with the signal from the antenna 11.

The effect of modulating the tuning of the loop circuit is illustrated vectorially in Fig. 2. The vector A represents the signal from the non-directional antenna 11. The loop voltage L is in quadrature phase with respect to the voltage A when the loop circuit is tuned to resonance. The vectors L' and L'' represent the loop circuit voltage as the tuning is varied slightly above and below resonance, shifting the phase of the voltage in opposite directions. The resultants R, R', and R'' are produced by the addition of the voltages L, L' and L'' respectively to the voltage A. The combined input to the radio receiver varies over the range of phase and amplitude between the vectors R' and R''. This includes both amplitude modulation and phase, or frequency modulation, and may be detected in the receiver 17 by a frequency discriminator circuit or by a rectifier.

In either event, the output of the receiver 17 is a voltage varying at the frequency of the oscillator 25 between two values corresponding to the lengths of the vectors R' and R'' of Fig. 2, or if a frequency responsive detector is used, to the angles of the two vectors with respect to some reference line, determined by the discriminator adjustment. When the angle of the loop with respect to an arriving wave is such as to pick up no signal, vectors R' and R'' are both equal to and identical with A, and the operation of the oscillator 25 causes no variation in the receiver output, as the loop is turned in one direction from the null position the vector L becomes longer, causing the vector R'' to become progressively longer than the vector R'. As the loop is turned in the other direction from the null, the vector L increases in a reverse direction as indicated by the dotted lines, and the vector R' becomes greater than R''.

The receiver output energizes the moving coil 21 of the device 23. The stationary coil 27 is energized by the alternating current output of the oscillator 25, and consequently causes the response of the indicator 23 to the receiver output to be periodically reversed in synchronism with the loop modulation.

Thus the coil 21 tends to deflect first one way and then the other. If the voltages R' and R'' are equal the alternate torques balance each other and no deflection occurs. If one exceeds the other, the indicator is deflected to the left or right according to the direction of wave arrival with respect to the axis of the loop.

Fig. 3 shows a modified form of the invention, comprising a loop 1, a vertical antenna 11, and loop modulating transformers 33 and 35 arranged to be operated by a low frequency oscillator 25. The receiver, indicator, and other parts of the system may be identical with the corresponding parts of the system of Fig. 1.

The loop 1 is connected to the primaries of the transformers 33 and 35 in opposite polarities. The transformer secondaries are connected in the same polarity to the amplifier 5. Saturating windings 37 and 39 are provided on the cores of the transformers 33 and 35 and connected through a direct current source, such as a battery 41, to the oscillator 25.

In operation, the cores of the transformers 33 and 35 are saturated alternately, so that more energy from the loop is transferred through one and then the other. This results, in effect, in periodic reversal of the loop voltage at the amplifier input. The sum of the transformer inductances coupled into the loop circuit remains substantially constant, so the tuning is not varied by the oscillator 25 and the loop output is amplitude modulated as in the usual balanced modulator arrangement.

Thus the invention has been described as an improved automatically indicating direction finder, employing magnetically saturable inductance means for left-right antenna switching. Considerable simplification of the required circuits and apparatus is achieved, with corresponding reduction of space and weight requirements.

I claim as my invention:

1. A radio direction finder comprising a directive antenna, a non-directive antenna, a generator of low frequency oscillations, reactance means in the circuit of one of said antennas, means for varying said reactance in response to said low frequency oscillations, means for combining the outputs of said antennas, a demodulating circuit connected to respond to the combined antenna output, and an indicator responsive to the combined outputs of said demodulating circuit and said low frequency generator.

2. The method of indicating the azimuth of arrival of a radio wave at an antenna system comprising the steps of deriving from said wave a signal related in amplitude to the said azimuth, deriving from said wave a second signal independent in amplitude of said azimuth, cyclically shifting the phase of one of said signals through an angle substantially less than 180°, combining the phase-shifted signal with the other of said signals, demodulating the combined signal, and comparing the amplitudes of alternate maxima of the demodulated signal.

3. A radio direction finder comprising a directive antenna, a non-directive antenna, a generator of low frequency oscillations, an inductor connected in the circuit of one of said antennas, said inductor being provided with a saturable ferromagnetic core, a winding for varying the magnetization of said core connected to said low frequency oscillator, a circuit for combining the outputs of said antennas, a detector connected to respond to the combined antenna output, and an indicator connected to said detector and to said oscillator so as to respond in opposite senses to said detector output during successive half cycles of said oscillator.

4. A radio direction finder comprising a directive antenna, a non-directive antenna, a generator of low frequency oscillations, transformers provided with saturable cores and with their primaries connected in unlike sense to the circuit of one of said antennas and their secondaries connected in like sense to a common impedance, means for combining the resultant of said transformer outputs with the output of the other of said antennas, means connected to said oscillator for alternately saturating the cores of said transformers, and an indicator arranged to respond to the combined antenna outputs in one sense while one of said cores is saturated and in the opposite sense while the other of said cores is saturated.

5. A radio direction finder comprising a directive antenna, a non-directive antenna, a generator of low frequency oscillations, inductance means provided with a saturable ferromagnetic core and connected in the circuit of one of said antennas, a winding connected to said low frequency generator for varying the magnetization of said core whereby the reactance included in said antenna circuit is varied in response to said low frequency oscillator, means for combining the outputs of said antenna, a demodulating circuit connected to respond to the combined antenna output and an indicator responsive to the combined outputs of said demodulating circuit and said low frequency generator.

WENDELL L. CARLSON.

REFERENCES CITED

The following references are of record in the file of this patent:

UNITED STATES PATENTS

| Number | Name | Date |
| --- | --- | --- |
| 2,254,943 | Galle | Sept. 2, 1941 |
| 2,286,804 | Hooven | June 16, 1942 |
| 2,279,151 | Wallace | Apr. 7, 1942 |
| 2,159,754 | Wohlfarth | May 23, 1939 |